(12) United States Patent
Schnegelberger et al.

(10) Patent No.: US 9,983,924 B2
(45) Date of Patent: *May 29, 2018

(54) ANALYTICS PLATFORM FOR AUTOMATED DIAGNOSIS, REMEDIATION, AND PROACTIVE SUPPORTABILITY

(71) Applicant: EMC Corporation, Hopkinton, MA (US)

(72) Inventors: Eric Schnegelberger, Youngsville, NC (US); Grissom Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

This patent is subject to a terminal disclaimer.

(21) Appl. No.: 15/059,011

(22) Filed: Mar. 2, 2016

(65) Prior Publication Data

US 2016/0239374 A1    Aug. 18, 2016

Related U.S. Application Data

(63) Continuation of application No. 14/038,312, filed on Sep. 26, 2013, now Pat. No. 9,313,091.

(51) Int. Cl.
*G06F 11/07*    (2006.01)
*H04L 12/24*    (2006.01)
*G06F 11/22*    (2006.01)

(52) U.S. Cl.
CPC ...... *G06F 11/0793* (2013.01); *G06F 11/2257* (2013.01); *H04L 41/0631* (2013.01); *H04L 41/16* (2013.01)

(58) Field of Classification Search
CPC .. G06F 11/0793; G06F 11/2257; H04L 41/16; H04L 41/0631; H04L 41/0654
See application file for complete search history.

(56) References Cited

U.S. PATENT DOCUMENTS

| | | | |
|---|---|---|---|
| 5,928,369 A | 7/1999 | Keyser et al. | |
| 6,918,059 B1 | 7/2005 | Galuten et al. | |
| 7,203,864 B2 | 6/2007 | Goin et al. | |
| 7,788,536 B1 | 8/2010 | Qureshi et al. | |
| 7,937,623 B2 | 5/2011 | Ramacher et al. | |
| 9,189,317 B1* | 11/2015 | Marimuthu | G06F 11/366 |
| 2004/0012808 A1* | 1/2004 | Payne | G06F 11/0733 358/1.15 |
| 2005/0114739 A1 | 5/2005 | Gupta et al. | |
| 2005/0120105 A1 | 6/2005 | Popescu et al. | |
| 2005/0278213 A1 | 12/2005 | Faihe | |
| 2006/0085785 A1 | 4/2006 | Garrett | |
| 2006/0184529 A1 | 8/2006 | Berg et al. | |
| 2007/0220036 A1 | 9/2007 | Das et al. | |
| 2007/0226546 A1* | 9/2007 | Asthana | G06F 11/008 714/47.1 |

(Continued)

*Primary Examiner* — Philip J Chea
*Assistant Examiner* — Wuji Chen
(74) *Attorney, Agent, or Firm* — Womble Bond Dickinson (US) LLP (57) ABSTRACT

Automatic remediation is provided to a serviced system. Selected system information associated with the serviced system is received. A set of one or more symptoms is generated using the selected system information. A knowledge repository is searched using the set of symptoms to identify a root cause. A remediation package corresponding to the root cause is obtained and, if permitted, the remediation package is caused to be performed on the serviced system.

20 Claims, 7 Drawing Sheets

(56) References Cited

U.S. PATENT DOCUMENTS

| | | |
|---|---|---|
| 2008/0040628 A1 | 2/2008 | Mandal |
| 2008/0126773 A1 | 5/2008 | Martinez et al. |
| 2008/0133208 A1 | 6/2008 | Stringham |
| 2008/0133540 A1 | 6/2008 | Hubbard et al. |
| 2009/0106363 A1 | 4/2009 | Fallen et al. |
| 2010/0064285 A1* | 3/2010 | Dechovich .......... G06F 11/0793 717/173 |
| 2010/0077008 A1* | 3/2010 | Davis ............... G06F 17/30011 707/797 |
| 2010/0218030 A1* | 8/2010 | Bhatnagar ........... G06F 11/0748 714/2 |
| 2011/0131453 A1 | 6/2011 | Fernandess et al. |
| 2012/0041575 A1 | 2/2012 | Maeda et al. |
| 2012/0078837 A1* | 3/2012 | Bagchi .................... A61B 5/00 706/52 |
| 2012/0130968 A1 | 5/2012 | Mule |
| 2012/0226943 A1 | 9/2012 | Alderman et al. |
| 2012/0303618 A1 | 11/2012 | Dutta et al. |
| 2013/0007527 A1* | 1/2013 | Petukhov ............ G06F 11/0793 714/37 |
| 2013/0073552 A1 | 3/2013 | Rangwala et al. |
| 2013/0091266 A1 | 4/2013 | Bhave et al. |
| 2013/0254599 A1 | 9/2013 | Katkar et al. |
| 2014/0025588 A1* | 1/2014 | Chinnappa ............. G06Q 30/01 705/304 |

\* cited by examiner

FIG. 6

ANALYTICS PLATFORM FOR AUTOMATED DIAGNOSIS, REMEDIATION, AND PROACTIVE SUPPORTABILITY

CROSS REFERENCE TO OTHER APPLICATIONS

This application is a continuation of co-pending U.S. patent application Ser. No. 14/038,312, entitled ANALYTICS PLATFORM FOR AUTOMATED DIAGNOSIS, REMEDIATION, AND PROACTIVE SUPPORTABILITY filed Sep. 26, 2013 which is incorporated herein by reference for all purposes.

BACKGROUND OF THE INVENTION

Some systems are sold with servicing support (e.g., either as an add-on contract, or included for free with the purchase price) where the buyer is able to get support from the seller (or a third-party support provider) in the event of a system failure or other performance issue. Typically, this process involves the buyer calling in to a support center and having the support center operator ask the caller a series of questions about the problem. The support center operator then tries to identify the problem; this often cannot be performed over the phone and may include consulting more experienced call center operators, consulting the developers or engineers who built the system, searching through manuals, searching through old support case files, and so on. In some cases, support staff is sent to the customer location for diagnosis of the problem. Improved support systems would be desirable, both on the customer side and the support provider side. For the customer, they may experience less "down time" and on the support provider side, less time and money may be consumed performing support services.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A remediation system which automatically diagnoses issues in a serviced system (e.g., system crashes, unresponsive features or tools, excessive and unexplainable reductions in system performance, and so on) and automatically executes a remediation package to address the issue (if permitted) is described herein. In various examples, issues can be related to hardware, software, configuration, and/or compatibility/interoperability with other applications or systems. Such an automated support system is useful for the owner of the serviced system since problems are able to be identified and addressed without having to call into a support center. In some cases, issues on the serviced system can be identified and resolved before they reach a critical stage (e.g., before a crash, before a tool or feature goes down, etc.). For the support provider, the automated support system reduces the amount of time and money which must be spent on issue identification and resolution.

Figure 1:
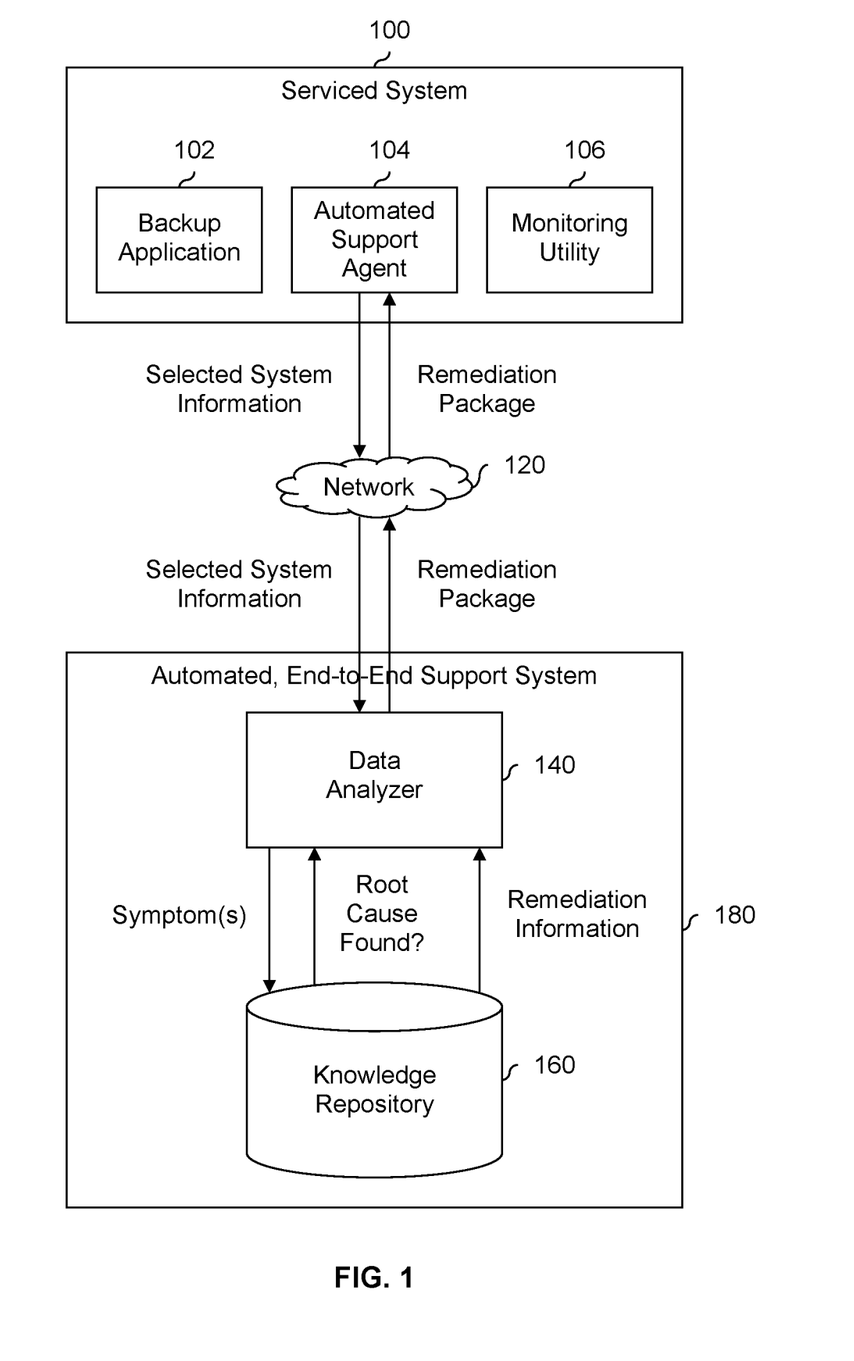
FIG. 1 is a diagram showing an embodiment of an automated, end-to-end remediation system.

FIG. 1 is a diagram showing an embodiment of an automated, end-to-end remediation system. In the example shown, serviced system 100 is supported by automated, end-to-end remediation system 180. Automated support agent 104 is configured to monitor selected system information. The information which is monitored may change over time, so that if a new log file, register or setting needs to be monitored, this can be added by configuring automated supported agent 104 appropriately. Any appropriate protocol may be used to assemble and/or transport the selected system information, such as syslog, SNMP, or HTTPS.

The selected system information is sent from automated support agent 104 on serviced system 100 to data analyzer 140 on support system 180 via network 120. In this example, support system 180 monitors other serviced systems (not shown) and so the selected system information is encapsulated or identified in some manner that uniquely identifies the serviced device from which that information originated. In one example, the selected system information is included in a packet having the format. Table 1 shows an example packet format and some example values.

TABLE 1

Example packet format used to encapsulate selected
system information and example values.

| Serviced System Type | Serviced System ID | Timestamp | Selected System Information |
| --- | --- | --- | --- |
| Data Domain Deduplication Storage System | ABC123 | September 1, 2013 12:00:00 | See example below |

In some embodiments, automated support agent 104 has configurable schedules when and/or if to send specified system information to support system 180. For example, depending upon how important or time-sensitive a piece of system information is, the frequency or schedule is set accordingly. In Table 2 below, an exception or error code normally does not exist, but if one is generated, it is immediately transferred to the support system. In contrast, an operating system version number does exist all the time or is available all the time, but it is only sent (immediately in this example) if it changes (e.g., because there is an upgrade in the operation system version). It is not necessary, for example, to send the same operating system version number over and over when it is not changing. The identifier of a utility installed or running on serviced system 100 is sent during a next daily transfer whenever that value changes (e.g., when a new utility is installed). An amount of available memory or processing is sent during a daily transfer of system information. An overview of a system status may include whether the system is down or has hung and is sent at a next daily transfer, whenever the system status changes. For example, such an overview may be a quick way to tell if there is a major issue with the system (but the overview may not necessary expose more subtle issues with the system).

TABLE 2

Example schedules for transmitting system information.

| System Information | Transmission Schedule |
| --- | --- |
| Exception or Error Code | Immediate transfer |
| Operating System Version Number | Immediate transfer, whenever it changes |
| Utility Identifier | At next daily transfer, whenever it changes |
| Available Memory or Processing | At daily transfer |
| Overview of System Status | At next daily transfer, whenever it changes |

In some embodiments, guided collection is used (e.g., in addition to and/or as an alternative to scheduled transmission) to collect and transmit selected system information. An example of guided collection is described in further detail below.

As described above, some system information does not exist all the time. For example, interruptions or exceptions are only generated occasionally and do not exist all the time. Similarly, error log files do not exist all the time and are only created when an error occurs and a log dump is triggered as a result of the error. In some other cases, the schedule of a given piece of system information means that that piece of system information is not sent all the time (i.e., its transmission schedule is unpredictable). As a result, what information is actually transmitted each time may vary from transmission to transmission. In some embodiments, a packet format which includes multiple fields (each of which is optional) is used so that data analyzer 140 is able to parse the received information without having to know in advance what selected system information is being exchanged at that particular instance. For example, the following identifier numbers may be used to uniquely identify a given piece of system information.

TABLE 3

Example identifier numbers for system information.

| Identifier Number | System Information |
| --- | --- |
| 0 | Exception or Error Code |
| 1 | Operating System Version Number |
| 2 | Utility Identifier |
| 3 | Available Memory or Processing |
| 4 | Overview of System Status |

Using the identifier numbers above, a given piece of system information has the format: [identifier number] [length of system information] [system information]. The identifier number field indicates what type of system information follows. The length field is used so that data analyzer 140 (which parses the received information) knows where one piece of system information ends and the identifier number for the next piece of system information begins (i.e., the length field indicates the length of the system information which follows). An End of Frame (EOF) marker or End of Segment (EOS) marker may be used to indicate when there is no more system information. In one example, if only an available amount of memory or processing is being transmitted then it would look like [3] [1 byte] [45%] [EOS]. In another example, if an exception or error code is being transmitted in addition to an operating system version number, then it would look like [0] [1 byte] [14] [1] [1 byte] [17] [EOS].

In some embodiments, a third party tool is used to at least partially collect and/or report the selected system information. For example, there are some third party configuration management tools on the market which report a variety of configurations (e.g., of the system, of hardware components or software elements of applications installed on the system, etc.). Using such a third party tool may be attractive if that tool has to be on serviced system 100 anyway. For example, some remediation packages are configured to be executed by a configuration management tool; in such embodiments it makes sense to make use of the configuration management tool for reporting since it is already being used to perform the automated fix.

Returning to FIG. 1, data analyzer 140 assembles a set of one or more symptoms from the selected system information. In this example, the selected system information is still mostly in native format and the selected system information is transformed and/or mapped into the set of symptoms. One benefit to this mapping or transformation is that the selected system information (e.g., still mostly in its native format) can be compressed into a more memory efficient format. For example, suppose that the programmers who selected the error codes skipped values in order to reserve available spots or gaps for future error codes (e.g., the programmers defined an error code of 0 to indicate "storage full" and then the next defined error code is 10, which indicates "unexpected loss of power"). In order to compress this information, an error code of 0 (e.g., included in selected system information collected by an automated support agent) is mapped to a symptom of an error code of 0, and an error code of 10 (e.g., included in selected system information collected by an automated support agent) is mapped to a symptom of an error code of 1. Using symptoms which are compressed compared to the selected system information (e.g., in its native format as it is on serviced system 100), fewer bits are consumed.

In some embodiments, a transformation or mapping from selected system information to a symptom by data analyzer 140 strips away or cleanses the selected system information of unnecessary elements that are not necessarily needed. For example, suppose a piece of selected system information is a process or task manager report (e.g., generated by Windows Task Manager or some other utility which reports information about which processes are running on a system). In this example, the task manager report includes an image name (e.g., WINWORD.EXE *32), user name (e.g., john_doe), which CPU is used to run the process (e.g., if the system is a multi-processor system), the amount of memory consumed, and a description (e.g., Microsoft Office Word). Some fields in the task manager report (e.g., user name) may not be of interest since they are not useful in diagnosing or uniquely identifying a problem. As such, such fields in the task manager report are discarded as part of the transformation from selected system information to a set of symptoms.

In some cases, a symptom (or selected system information) is a negative symptom (or negative selected system information) where that symptom (e.g., when considered in and of itself, without taking into consideration any other symptom) is an indicator or sign of a bad thing. Some example negative symptoms are error codes (e.g., a code indicating that a certain type of error occurred) or timeouts (e.g., when a service or component is unresponsive for more than a certain amount of time). In some cases, a symptom (or selected system information) is a neutral symptom (or neutral selected system information) where that symptom (e.g., when examined in and of itself) does not indicate that anything bad has occurred. Some neutral symptom examples are operating system identifiers, build numbers, and other settings or configurations. These types of things do not (e.g., by themselves) indicate that something bad has occurred, and thus they are neutral symptoms as opposed to negative symptoms.

Returning to FIG. 1, data analyzer 140 queries or searches knowledge repository 160 using the set of symptoms. In some embodiments, knowledge repository 160 comprises some database or other system which is specifically configured and/or optimized to return search results quickly. If a root cause is found based on the provided symptom(s), remediation information is returned to data analyzer 140 from knowledge repository 160. In some embodiments, the returned remediation information is the remediation package itself (e.g., associated with that particular root cause or issue). In some embodiments, the returned remediation information indicates where the remediation package can be obtained from (e.g., from a support case tracking system which stores system configuration setting(s) or updates which need to be changed or installed in order to fix the root cause or issue).

The remediation packet is sent from analyzer 140 to automated support agent 104 via network 120. If permitted, automated support agent 104 causes the remediation package to be performed on serviced system 100. This decision may depend upon the particular remediation package. In one example, the root cause or issue relates to monitoring utility 106 being in a stuck or frozen state and the remediation package includes restarting monitoring utility 106. Since restarting monitoring utility 106 (even unexpectedly and/or without asking for permission) would not cause a significant error or failure, that remediation package is performed.

Alternatively, if the remediation package is to upgrade the operating system of serviced system 100, it may be undesirable to perform the remediation packet without first obtaining permission from and/or coordinating the execution with a system administrator who manages serviced system 100. In such cases, the system administrator may be notified about the remediation package and the system administrator is the one who actually initiates or causes the remediation package to be performed. In some cases, a technical support engineer also facilitates or assists in remediation (e.g., because the technical support engineer has specific training to perform the remediation which an in-house system administrator does not have). In some other examples where permission or cooperation is desirable, a remediation package may require a hardware component to be replaced or a system reboot, both of which require the system to go down, either for a few hours in the former case or for a briefer period of time in the latter example.

In some embodiments, backup application 102 is a third party application, for example which is unaffiliated with the company which sold and/or is responsible for serviced system 100. In some such embodiments, a remediation which affects or is directed to a third party application or other entity is not performed automatically. For example, the required permissions to make such a change may not be granted to automated support agent 104 and/or it may be a liability issue. In some such embodiments, a remediation is suggested but is not actually performed (e.g., sending a message that version X of backup application 102 is known to have an issue with the most current operating system of serviced system 100 and an upgrade to version X.1 of the backup application is suggested).

Figure 2:
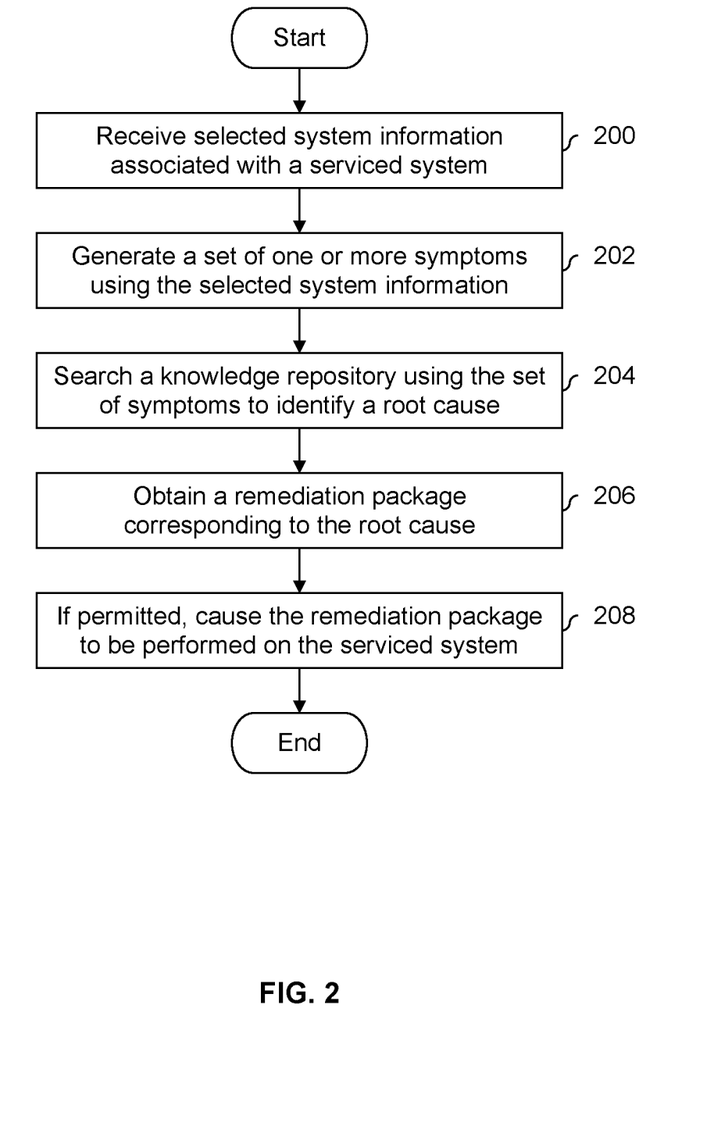
FIG. 2 is a flowchart illustrating an embodiment of a process for providing an automated, end-to-end remediation system.

FIG. 2 is a flowchart illustrating an embodiment of a process for providing an automated, end-to-end remediation system. In some embodiments, the process is performed by data analyzer 140 in FIG. 1. At 200, selected system information associated with a serviced system is received. For example, in FIG. 1, automated support agent 104 may be installed on serviced system 100 and configured to monitor and automatically transfer specified system information. In some embodiments, guided collection is performed at step 200. For example, suppose a negative symptom is received, such as an error code. The negative system (e.g., by itself) is provided to the knowledge repository, which indicates that no root cause is found (e.g., because additional symptoms need to be known before the root cause can be uniquely identified). The knowledge repository then indicates what additional symptoms should be specified and the data analyzer instructs the automated support agent to return the corresponding selected system information. A more complete set of symptoms is then provided to the knowledge repository, which enables a more specific search and/or reduces the number of possible root causes. The system information which is specified or selected (e.g., at the automated support agent) is thus guided by the feedback from the knowledge repository, hence the term "guided collection."

At 202, a set of one or more symptoms is generated using the selected system information. In some embodiments, a generated set of symptoms uses previously received and stored selected system information (e.g., some selected system information such as version number may change infrequently and it is acceptable to store slowly-changing information). As described above, in some embodiments, generating a set of symptoms includes stripping out unhelpful or unnecessary information and/or compressing information into a more compact form.

At 204, a knowledge repository is searched using the set of symptoms to identify a root cause. At 206, a remediation package corresponding to the root cause is obtained. As described above, in some embodiments, a knowledge repository contains the remediation package. In some other embodiments, the knowledge repository stores or records where the remediation package can be obtained or how the remediation package can be assembled or generated.

At 208, if permitted, the process causes the remediation package to be performed on the serviced system. In some embodiments, a remediation package is permitted to be executed if it is not risky and/or would only minimally affect other applications or components. In some embodiments, a configuration management tool (e.g., Puppet Enterprise) is used to execute the remediation package. In some embodiments, permission from and/or cooperation with a system administrator of a serviced system is obtained first before executing the remediation package.

In one example, the serviced system is a Data Domain deduplication storage system and the storage system is used primarily as a backup and restore. Storage systems which are used as backup and restore devices often have a monitoring utility running on the storage system. These monitoring utilities may (for example) report back with device temperature, amount of available or used storage, which processors are running, and so on. A not uncommon problem is that these monitoring utilities sometimes become stuck. The fix to the problem is to restart the monitoring utility and restarting (even unexpectedly, without warning, and/or without first obtaining permission) does not have catastrophic or unacceptable effects on the system as a whole or other applications or utilities on the storage system. As such, in some embodiments, if (based on the set of symptoms) the root cause of the problem is determined to be a stuck monitoring utility, the monitoring utility is restarted since restarting the monitoring (e.g., without warning) has a minor impact.

Many bugs and issues have previously been reported, for example, by the same customer or another customer. The problem is that the information may be spread out amongst multiple systems and/or there is a lot of information to search through (e.g., the needle in the haystack scenario). The following figures describe exemplary techniques for automatically processing one or more knowledge sources and/or populating a knowledge repository. Oftentimes, these sources of knowledge contain large amounts of information, and processing them manually would be prohibitively time consuming and prone to inconsistency and/or error. The following figures are merely exemplary and are not intended to be limiting.

Figure 3:
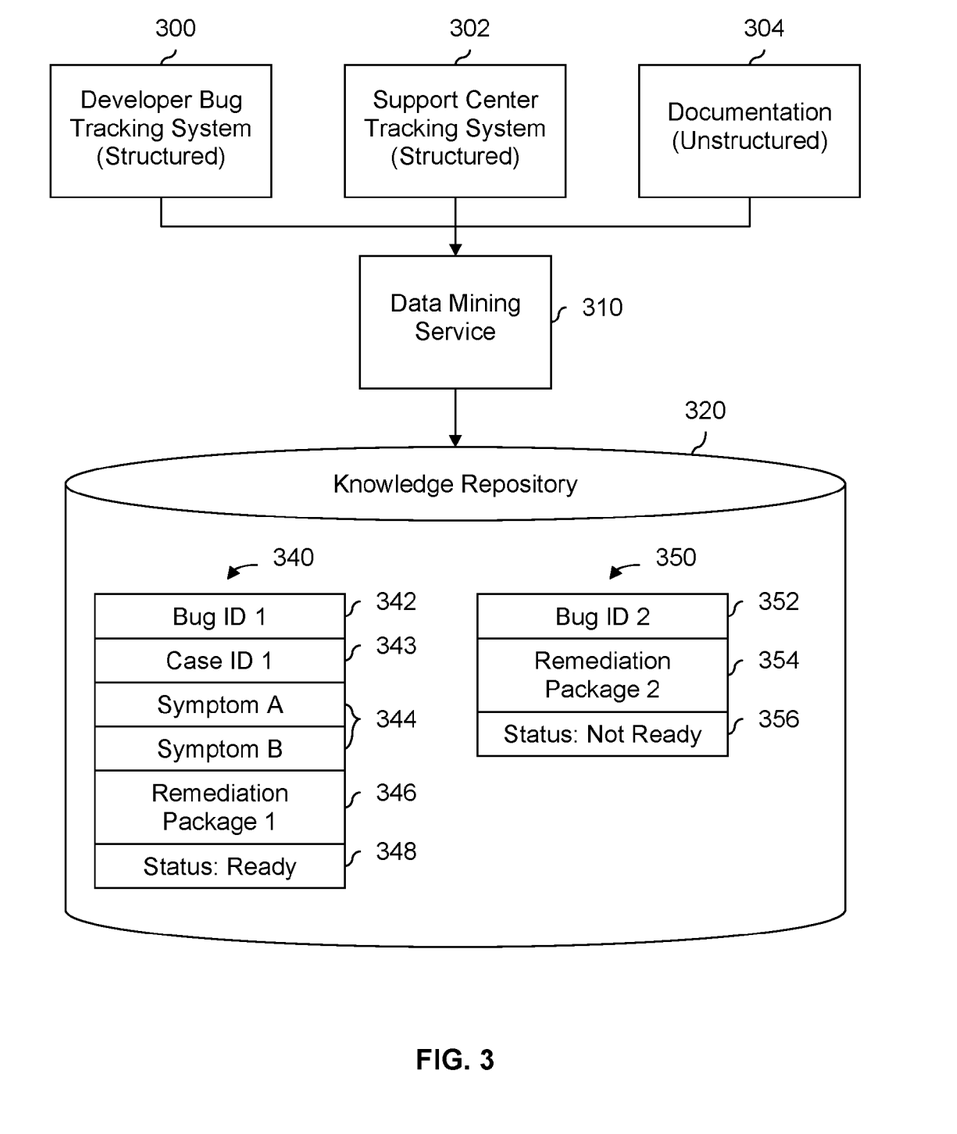
FIG. 3 is a diagram showing an embodiment of a data mining service which populates a knowledge repository.

FIG. 3 is a diagram showing an embodiment of a data mining service which populates a knowledge repository. In the example shown, data mining service 310 processes knowledge sources 300, 302, and 304 and populates knowledge repository 320 with one or more identifiers, one or more symptoms, and a corresponding remediation package.

Knowledge source 300 is a developer bug tracking system which is used by developers (e.g., programmers or engineers) to track bugs. Each bug may be assigned a bug identifier, a programmer or engineer responsible for the bug, a bug status (e.g., open, fixed), and (once fixed) how the bug was fixed and/or what will fix the bug. One example of developer bug tracking system 300 is Bugzilla. Developer bug tracking system 300 is a rich source of technical information which often very specifically describes a fix from which a remediation package may be generated. For example, it is common practice for the programmer or engineer assigned a bug to document (in developer bug tracking system 300) the specific module or component which includes the fix (e.g., transmit buffer) and the version or build number of that module or component (e.g., version 3.2).

Knowledge source 302 is a support center tracking system used by a support center. For example, when a customer calls in with a complaint, support staff at a call center may use tracking system 302 to open a case file, take down the details of the issue, and so on. Support center tracking system 302 may have case identifiers to track the reports cases, a status of the reported issued (e.g., open, closed), and notes by various support staff documenting the root cause and what the eventual fix was. Support center tracking system 302 is a rich source of symptoms, since support staff at a call center is typically trained to document all reported issues and/or symptoms (e.g., the customer reports they recently installed a new application or upgraded some hardware component, the customer noted that a specific service or tool became unresponsive, a certain error code was displayed by the system, etc.).

Knowledge source 304 includes documentation, such as product manuals, white papers, guides, reports, or knowledge base articles (e.g., which describe a bug by its symptoms, who is exposed to this problem (e.g., what versions of components, applications, operating systems, etc.) and how to solve it). This documentation often describes best or recommended practices or configurations for using and/or managing a serviced system (e.g., product manuals which are consulted during installation) and/or symptoms of issues and how to resolve such issues (e.g., knowledge base articles). For example, a serviced system may be expecting an application running on it to follow a certain protocol, otherwise the serviced system may hang. This may be documented in documentation 304. In another example, the serviced system may require a certain number of processors or a certain amount of memory; otherwise the system may crash under head loads. Documentation 304 may thus be a rich source of symptoms and/or remedies.

In this example, tracking systems 300 and 302 are structured, in that data is divided up or separated and there is some metadata or knowledge about what a given field or data object indicates or is associated with. For example, both developer bug tracking system 300 and support center tracking system 302 may both have separate data objects for each case or each bug report, and within each data object there are one or more fields, each of which corresponds to a different piece of information. Developer bug tracking system 300 may include a field that identifies the component(s) or module(s) that include the fix and another field that includes the build or version numbers of those component(s) or module(s). Support center tracking system 302 may include one or more fields for reported symptom(s) (e.g., a build or version number of the supported system, a system type, whether the system crashed, if a particular component was unresponsive, etc.). Since those systems are structured, data mining service 310 is able to ingest cases and bug reports individually and know which fields to go to in order to obtain the appropriate information. For example, the bug identifiers and case identifier in issue packages 340 and 350 are obtained by data mining service 310 from the appropriate field in structured systems 300 and 302. Similarly, symptom 344 may be obtained from the appropriate field in support center tracking system 302, and remediation package 346 is generated or obtained using the appropriate field(s) in developer bug tracking system 300.

In this example, issue packages 340 and 350 include a status field which indicates whether an issue package is ready to be used. An issue package is determined by data mining service 310 to be ready to use when there is (at a minimum) a set of one or more symptoms and a remediation package. For issue package 340, this is the case because there is a clear association between a case in support center tracking system 302 and a bug report in developer bug tracking system 300. The support center in this case created a case and it was (eventually) reported to the developers. A bug report was created and (since the case identifier is known) the corresponding case identifier is included in the bug report. As such, issue package 340 includes a bug identifier 342 and case identifier 343, and the symptoms (344) and corresponding remediation package (346) are known. Status 348 is thus set to ready.

In contrast, issue package 350 is associated with a bug that was found by the developers themselves (e.g., the developers found it using test patterns and/or simulations) and includes bug identifier 352, remediation package 354, and status 356. A bug report was created, but because there is no known corresponding case in support center tracking system 302, no case identifier is included in the bug report, and thus there is no case identifier in issue package 350 and no set of symptoms. Since there are no symptoms, status 356 is set to not ready. In various embodiments, one or more symptoms may be added to issue package 350 later on by a user, or by data mining service 310 (e.g., once a corresponding bug report has been created in developer bug tracking system 300 and a patch has been created and verified), and status 356 at that time may be changed to ready.

In some cases, there may be duplicate cases in support center tracking system 302 and as such there may be multiple case identifiers; these additional identifiers are referred to as aliases. For example, one customer may call into a call center with a problem, and then some time later another customer calls in with the exact same problem. Two cases would be created and two case identifiers would be assigned for the same problem. In some embodiments, aliases (i.e., additional identifiers) are included in an issue package. This may be useful because then it is known that a particular duplicate case has been ingested by the data mining service (and thus auditing can be supported if desired), and the appropriate issue package can be located using any of the aliases.

In this example, data mining server 310 is used to initially populate knowledge repository 320. In addition to data mining server 310 being able to add or otherwise modify information in knowledge repository 320, any number of other components are able to add or otherwise modify information in knowledge repository 320. For example, if desired, an expert is able to view and modify the information in knowledge repository 320 after data mining service 310 has populated it.

Unlike tracking systems 300 and 302, documentation 304 is unstructured data (e.g., a Microsoft Word document or a PDF file). To accommodate this, data mining service 310 includes natural language processing which analyzes the contents of the documentation, identifies any symptoms (e.g., looking for words or phrases like "crash," "hang," or "incompatible"), and identifies any remedies (e.g., looking for words or phrases like "should" or "recommended"). In one unstructured database example (e.g., Greenplum), keyword mapping techniques are used to match patterns. In one structured database example (e.g., mySQL), regular expression pattern matching is used. In some cases, if data mining service 310 is unsure of its results or it is unable to identify a remedy or set of symptoms, it creates an issue package with as much information as it is able to glean, and marks the status as not ready.

Figure 4A:
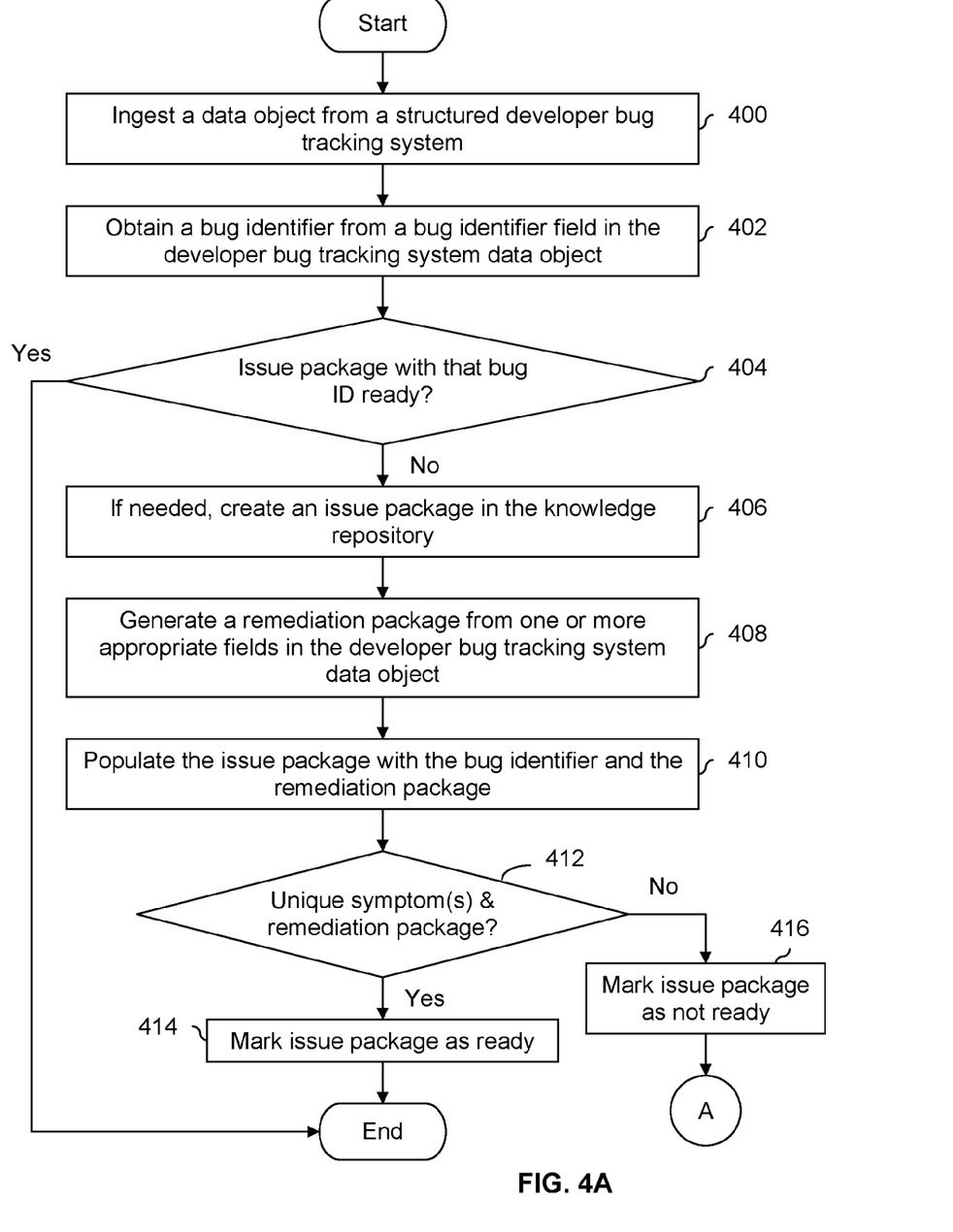
FIG. 4A is a flowchart illustrating an embodiment of processing performed on a data object from a structured developer bug tracking system.

FIG. 4A is a flowchart illustrating an embodiment of processing performed on a data object from a structured developer bug tracking system. In the example shown, the process is performed by data mining service 310 in FIG. 3. In some embodiments, the process shown herein is used to populate (e.g., at least partially) the knowledge repository which is searched at step 204 in FIG. 2. Note that FIGS. 4A and 4B assume that a developer bug tracking system may (in some cases) include a case identifier, but the converse is not assumed (i.e., it is not assumed that a case may (in some cases) include a bug identifier). Naturally, the exemplary processes described herein may be modified accordingly depending upon the particular tracking system implementation(s) and/or the specific practices of the developers or support providers who create and write bug reports and cases (e.g., if a case in a support center tracking system may (in some cases) contain a bug identifier).

At 400, a data object from a structured developer bug tracking system is ingested. In this example, the developer bug tracking system data object is associated with a single issue and so there is no need to divide up the information in the data object amongst multiple issue packages. At 402, a bug identifier is obtained from a bug identifier field in the developer bug tracking system data object.

At 404, it is determined if an issue package with the bug identifier has a status of ready. If so, the process ends.

If not (e.g., because the bug identifier was not located, or because the bug identifier was located, but the status is set to not ready), then (if needed) an issue package is created in the knowledge repository at 406.

At 408, a remediation package is generated from one or more appropriate fields in the developer bug tracking system data object. For example, one field may identify the component(s) or block(s) which incorporate the fix and another field may identify the build or version number. A remediation package may be generated by obtaining the appropriate version of the component from a code repository (e.g., "get <block name>-version <version number>" and then creating an executable installation or upgrade script).

At 410, the issue package is populated with the bug identifier and the remediation package. It is determined at 412 if the issue package includes a unique set of one or more symptoms and a remediation package. For example, if the set of symptoms is not unique (e.g., because another set of symptoms has the exact same set, or the other set is a superset), then it would not be desirable to activate that issue package since each of the set of symptoms in each activated issue package should be unique. If the check at 412 is okay, the issue package is marked as ready at 414 and the process ends. If not, the issue package is marked as not ready at 416 and the process continues in FIG. 4B.

Figure 4B:
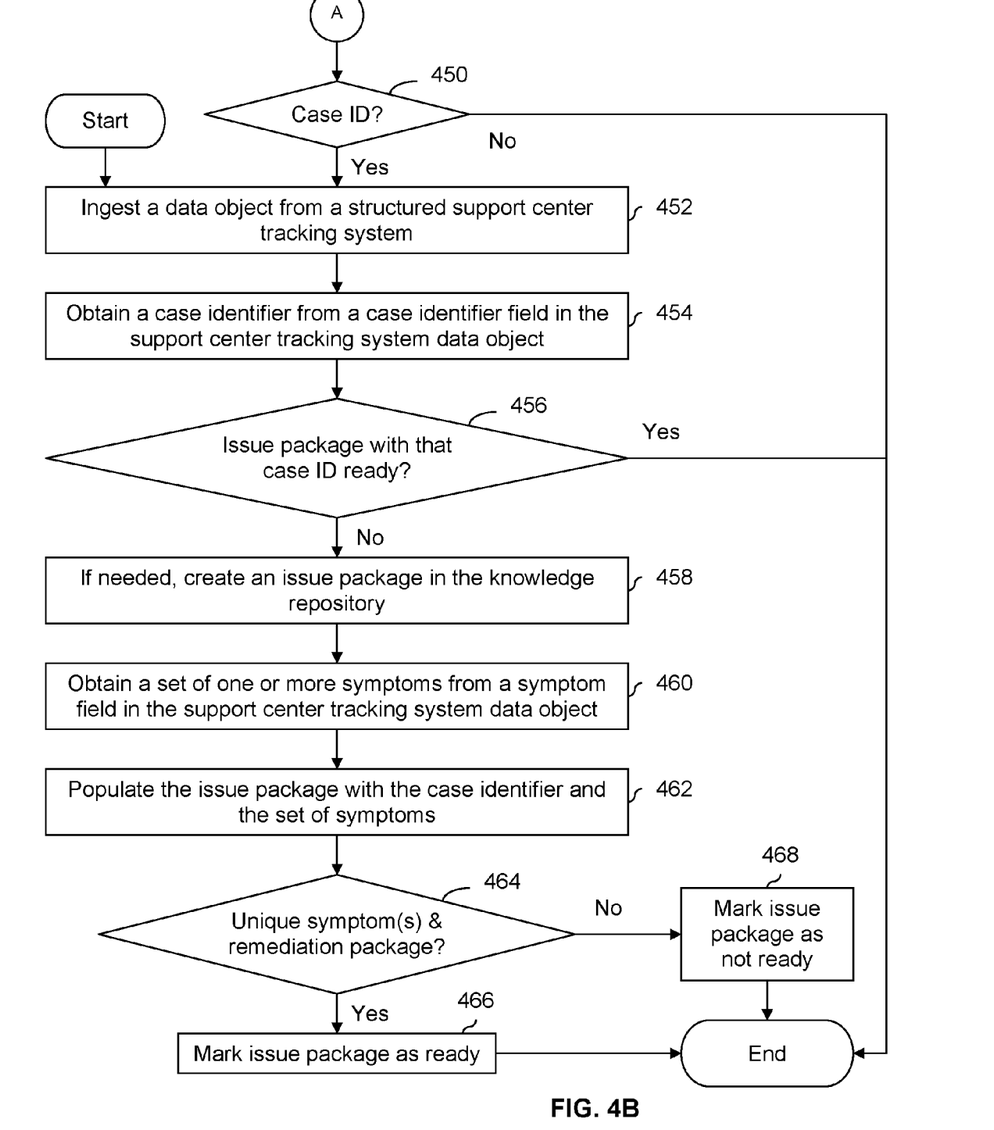
FIG. 4B is a flowchart illustrating an embodiment of processing performed on a data object from a structured support center tracking system.

FIG. 4B is a flowchart illustrating an embodiment of processing performed on a data object from a structured support center tracking system. In some embodiments, the process is entered via the process shown in FIG. 4A. If so, it is determined at 450 if the developer bug tracking system data object includes a case identifier. For example, this may be the case if the issue was first reported to a support center, and then the support center passed the issue on to the developers. If there is no case identifier, then the process ends. In this example, a case identifier in a bug report is the link between the bug report and a corresponding case and so if there is no link then the rest of FIG. 4B is skipped (at least for now).

If it is determined at 450 that there is a case identifier, then at 452 a data object from a structured support center tracking system is ingested. In some embodiments, the process of FIG. 4B is performed without first going through the process of FIG. 4A and if so the process begins at step 452, skipping the check at 450. For example, FIG. 4B may be performed directly on a support center tracking system in order to ingest the information therein, even if some issue packages are incomplete and/or there is no "link" from a corresponding bug report in a developer bug tracking system.

At 454, a case identifier is obtained from a case identifier field in the support center tracking system data object. It is determined at 456 if there is an issue package with that case identifier with a status of ready. If so, the process ends. If not, an issue package is created in the knowledge repository if needed at 458.

At 460, a set of one or more symptoms from a symptom field in the support center tracking system data object is obtained. For example, this would be the report written up by a support provider or a transcription of the call generated by an automated speech-to-text tool. In some embodiments, natural language processing is used to separate out each individual symptom. In some embodiments, normalization is performed so that the symptoms in the knowledge repository are in some canonical and/or consistent form. At 462, the issue package is populated with the case identifier and the set of symptoms.

It is determined at 464 if the issue package includes a unique set of symptoms and a remediation package. If the check at 464 is okay, the issue package is marked as ready at 466. If not, the issue package is marked as not ready at 468.

In addition to a user being able to add to or otherwise modify knowledge repository 320, a feedback cycle is used to add to a knowledge repository (e.g., for new bugs that have yet to be reported to a support center, or which have only recently been reported). The following figure shows an example of this.

Figure 5:
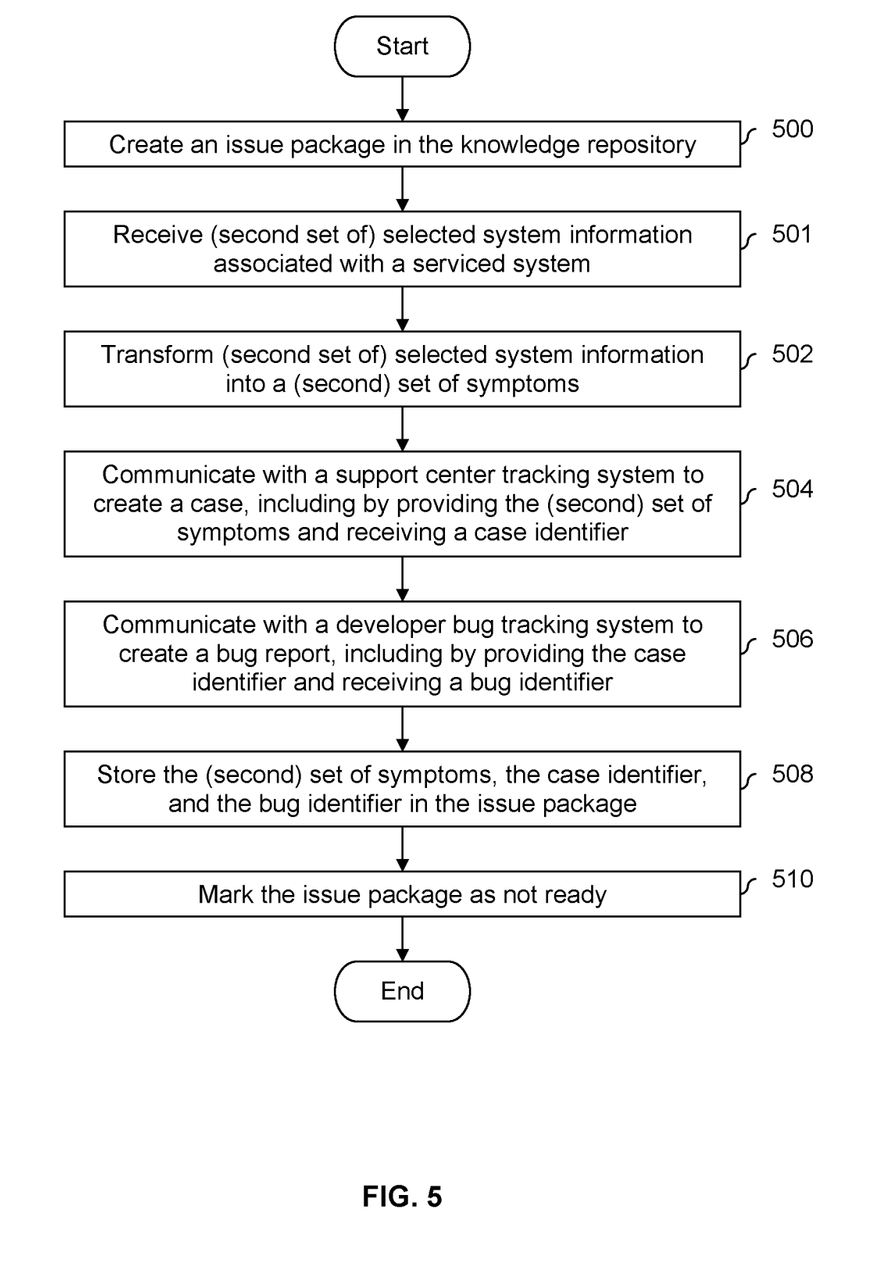
FIG. 5 is a flowchart illustrating an embodiment of a process for populating a knowledge repository using information obtained from a serviced system.

FIG. 5 is a flowchart illustrating an embodiment of a process for populating a knowledge repository using information obtained from a serviced system. In at least some cases, the process shown is a feedback process. In another example, the feedback process is performed if an issue package was found, but the corresponding remediation package did not ultimately fix the issue (e.g., the same symptoms or problem popped up again). In some cases, the feedback provided is that a root cause was not found for a given set of symptoms. For example, the feedback process shown may be performed if a set of symptoms (e.g., collected by a data analyzer and provided to a knowledge repository) has no match in the knowledge repository. In some embodiments, data analyzer 140 in FIG. 1 performs the process shown (e.g., with the assistance of automated support agent 104 to collect whatever system information is desired).

At 500, an issue package is created in the knowledge repository. At 501, a (second set of) selected system information associated with a serviced system is received. At 502, a (second set of) selected system information is transformed into a (second) set of symptoms. Note that the selected system information here at step 502 is not necessarily the same selected system information as in steps 200 and 202 in FIG. 2. Similarly, a different set of symptoms may be generated at step 502 versus step 202 in FIG. 2. For example, since a new problem or issue may have been discovered, it may be better to have more information (i.e., more symptoms) than less symptoms since it is probably not known what symptoms are indicative of or related to the issue. In some embodiments, a template of selected system information is obtained using an automated support agent. For example, experienced developers and/or support staff may contribute to the system information and/or symptoms they would like to see when debugging (e.g., they may want to know what processes were running, if any error codes were generated, etc.).

At 504, a support center tracking system is communicated with to create a case, including by providing the (second) set of symptoms and receiving (back) a case identifier. In some cases, there will already be a case open at which point we would update the existing case with the new information. At 506, a developer bug tracking system is communicated with to create a bug report, including by providing the case identifier and receiving (back) a bug identifier. Steps 504 and 506 are attractive for a number of reasons. First, it speeds up the process of letting support staff and developers know that there is (potentially) a new issue with a serviced system. A case and a bug report have been created, even if it is in the middle of the night and no one on the serviced system side has noticed that there is a problem. Another advantage is that since the bug report include the case identifier, it will be easier for the automated, end-to-end remediation system to create a complete issue package that is ready to be used. This ensures that there is a link from the bug report in the developer bug tracking system back to the case in the support center tracking system so that the knowledge repository can more easily and/or completely be populated with information.

At 508, the (second) set of symptoms, the case identifier, and the bug identifier are stored in the issue package. At 510, the issue package is marked as not ready. As described above, since the bug report includes the case identifier, it will be easier to add the remediation package to the proper issue package once a fix has been created and verified.

Figure 6:
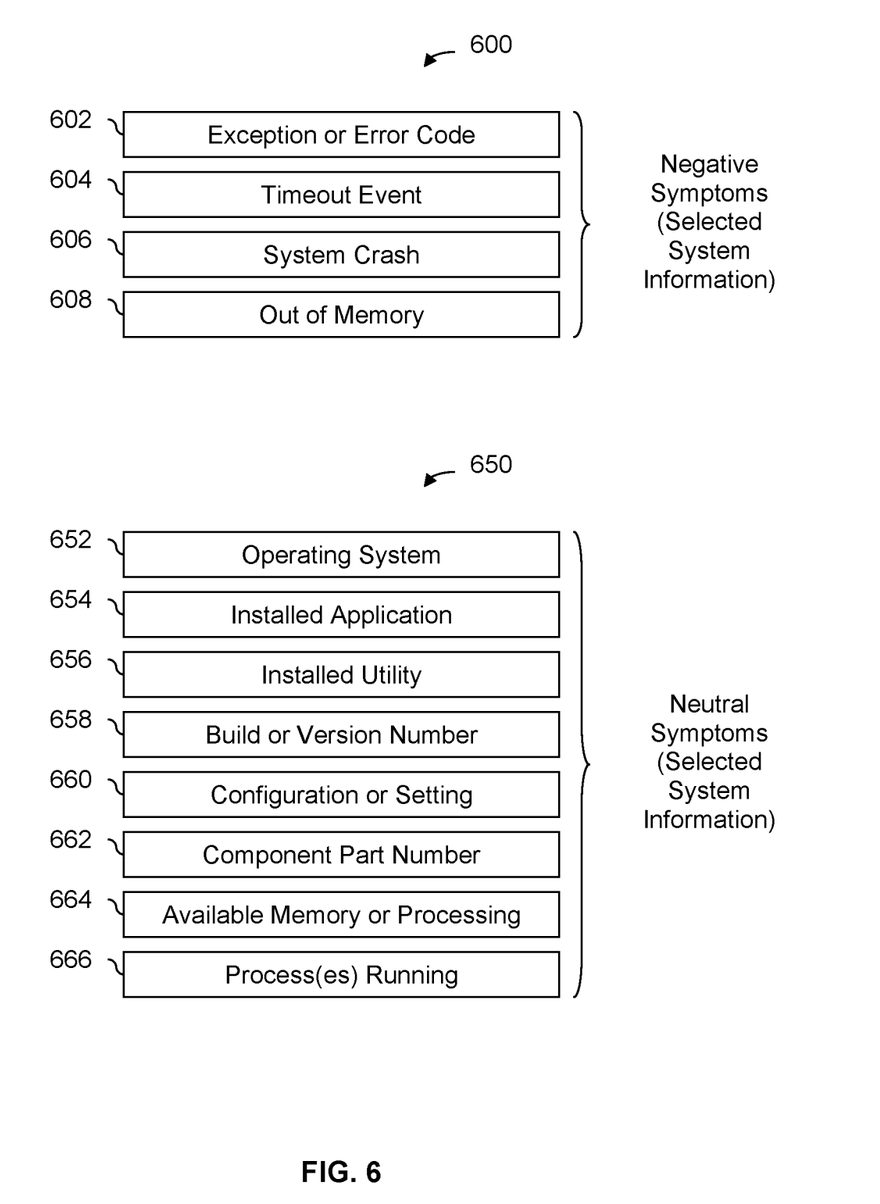
FIG. 6 is a diagram showing an embodiment of negative symptoms and neutral symptoms.

FIG. 6 is a diagram showing an embodiment of negative symptoms and neutral symptoms. Symptoms are obtained from selected system information, so the examples shown are also examples of negative selected system information and neutral selected system information. Negative symptoms 600 includes an exception or error code (602), a timeout event (604), a system crash (606), and an out of memory event (608). An exception or error code is output by a component or application when an error occurs and the code gives some indication of what caused the error, what type of error occurred, etc. A timeout event occurs when a tool or service is unresponsive for more than a certain amount of time and the associated request or function call times out. A system crash occurs when the entire system (e.g., including all components and applications) goes down. An out of memory event occurs when the available or allocated memory is full and there is no more space in which to store information (e.g., by an application, the operating system, etc.).

Neutral symptoms 650 include an operating system (652), an installed application (654), an installed utility (656), a build or version number (658), a configuration or setting (660), a component part number (662), available memory or processing (664), and process(es) which are running (666). Build or version number 658 may refer (as an example) to operating system 652, installed application 654, or installed utility 656. Similarly, configuration or setting 660 may refer to a configuration or setting associated with operating system 652, installed application 654, or installed utility 656. Component part number 662 refers to the part number of a hardware semiconductor chip or other component. For example, a component in a support system may be provided by two suppliers who are supposed to build the same component according to a common specification. Component part number 662 may identify a supplier or version of the component (e.g., if there was a "re-spin" of a semiconductor chip, it may identify whether it is the old chip or the new chip). This may, for example, be useful if there is an issue with one supply or one version of a component but not other suppliers or other versions. Available memory or processing 664 describes the amount (e.g., number of processors in a multi-processor system, or MB of available memory) or percentage of memory or processing which is unused and is thus available. Process(es) running 666 identifies the processes that are running. For example, a third party utility such as Windows Task Manager may be used to obtain a list of applications or processes which are running on the system (e.g., where the processes running include or are a superset of the applications which are running).

In some cases, there are multiple problems which are similar. The key is to identify the unique bug signature for each bug which differentiates it from another similar bug or condition. An example is a disk timeout condition which occurs multiple times within a certain time frame. In this instance, a disk timeout is a normal occurrence but if it happens too frequently within a given time frame it is a "bad" condition and requires remediation. The two situations are similar in that there is at least one disk timeout, but in the "bad" one the disk timeout occurs multiple times within a given time frame (e.g., so one symptom may be associated with a window of time and another symptom may be a number of disk timeouts which occur over that window of time).

Another example is a configuration issue in which a system symptom could be unusable storage and the root cause could be insufficient (e.g., allocated) memory to support the storage. The lack of memory is a strong indicator (e.g., highly correlated) that could cause the symptom of unusable storage but there could be other reasons that would cause the unusable storage that are unrelated to lack of memory. However, an amount of (e.g., allocated) memory may differentiate between various root causes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing automatic remediation to a serviced system, comprising:
   receiving feedback from an automated support agent of the serviced system, wherein the feedback indicates that a previously sent remediation package did not resolve an issue of the serviced system corresponding to a first set of one or more symptoms generated from a first set of selected system information of the serviced system;
   receiving a second set of selected system information associated with the serviced system;
   in response to the received feedback and the received second set of selected system information, generating a second set of one or more symptoms using the second set of selected system information, wherein the second set of one or more symptoms represents additional symptoms;
   creating an issue package that includes the second set of one or more symptoms that allows a corresponding remediation package to be added; and
   if permitted, causing the corresponding remediation package of the issue package to be performed on the serviced system.

2. The method of claim 1, wherein the issue package is created in a knowledge repository that includes information from one or more knowledge sources.

3. The method of claim 1, wherein the issue package is created in a knowledge repository that includes information from one or more knowledge sources, wherein the one or more knowledge sources include one or more of the following: a developer bug tracking system, a support center tracking system, or documentation.

4. The method of claim 1, further comprising:
   providing to a support center tracking system the second set of symptoms; and
   receiving from the support center tracking system a case identifier.

5. The method of claim 1, further comprising:
   providing to a support center tracking system the second set of symptoms;
   receiving from the support center tracking system a case identifier;
   providing to a developer bug tracking system the case identifier; and
   receiving from the developer bug tracking system a bug identifier.

6. The method of claim 1, wherein the issue package further includes a case identifier and a bug identifier.

7. The method of claim 1, further comprising marking the issue package as not ready.

8. The method of claim 1, wherein the previously sent remediation package did not resolve the issue of the service system due to an inability to identify a root cause.

9. The method of claim 1, wherein the second set of selected system information associated with the serviced system reduces a number of possible root causes of the issue of the serviced system.

10. The method of claim 1, further comprising searching a knowledge repository using the second set of one or more symptoms to identify a root cause.

11. The method of claim 1, further comprising:
    searching a knowledge repository using the second set of one or more symptoms to identify a root cause; and
    obtaining a remediation package corresponding to the root cause.

12. A system for providing automatic remediation to a serviced system, comprising:
    a processor; and
    a memory coupled with the processor, wherein the memory is configured to provide the processor with instructions which when executed cause the processor to:
    receive feedback from an automated support agent of the serviced system, wherein the feedback indicates that a previously sent remediation package did not resolve an issue of the serviced system corresponding to a first set of one or more symptoms generated from a first set of selected system information of the serviced system;
    receive a second set of selected system information associated with the serviced system;
    in response to the received feedback and the received second set of selected system information, generate a second set of one or more symptoms using the second set of selected system information, wherein the second set of one or more symptoms represents additional symptoms;

create an issue package that includes the second set of one or more symptoms that allows a corresponding remediation package to be added; and if permitted, cause the corresponding remediation package of the issue package to be performed on the serviced system.

13. The system of claim 12, wherein the instructions further cause the processor to:

provide to a support center tracking system the second set of symptoms; and receive from the support center tracking system a case identifier.

14. The system of claim 12, wherein the instructions further cause the processor to:

provide to a support center tracking system the second set of symptoms;

receive from the support center tracking system a case identifier;

provide to a developer bug tracking system the case identifier; and receive from the developer bug tracking system a bug identifier.

15. The system of claim 12, wherein the issue package further includes a case identifier and a bug identifier.

16. The system of claim 12, method of claim 1, wherein the instructions further cause the processor to mark the issue package as not ready.

17. The system of claim 12, wherein the previously sent remediation package did not resolve the issue of the service system due to an inability to identify a root cause.

18. The system of claim 12, wherein the second set of selected system information associated with the serviced system reduces a number of possible root causes of the issue of the serviced system.

19. The system of claim 12, wherein the instructions further cause the processor to:

search a knowledge repository using the second set of one or more symptoms to identify a root cause; and obtain a remediation package corresponding to the root cause.

20. A computer program product for providing automatic remediation to a serviced system, the computer program product being embodied in a non-transitory computer readable storage medium and comprising computer instructions for:

receiving feedback from an automated support agent of the serviced system, wherein the feedback indicates that a previously sent remediation package did not resolve an issue of the serviced system corresponding to a first set of one or more symptoms generated from a first set of selected system information of the serviced system;

receiving a second set of selected system information associated with the serviced system;

in response to the received feedback and the received second set of selected system information, generating a second set of one or more symptoms using the second set of selected system information, wherein the second set of one or more symptoms represents additional symptoms;

creating an issue package that includes the second set of one or more symptoms that allows a corresponding remediation package to be added; and if permitted, causing the corresponding remediation package of the issue package to be performed on the serviced system.

* * * * *